(12) United States Patent
Roenneberg et al.

(10) Patent No.: US 10,555,591 B2
(45) Date of Patent: Feb. 11, 2020

(54) EPILATION DEVICE MEASURING CONTACT FORCE AND COMPRISING A FEEDBACK UNIT

(71) Applicant: Braun GmbH, Kronberg (DE)

(72) Inventors: Gerrit Roenneberg, Kelkheim (DE); Tarik Mehaddene, Karben (DE)

(73) Assignee: Braun GMBH, Kronberg (DE)

( * ) Notice: Subject to any disclaimer, the term of this patent is extended or adjusted under 35 U.S.C. 154(b) by 207 days.

(21) Appl. No.: 15/634,356

(22) Filed: Jun. 27, 2017

(65) Prior Publication Data

US 2018/0000219 A1 Jan. 4, 2018

(30) Foreign Application Priority Data

Jun. 30, 2016 (EP) ..................... 16177189

(51) Int. Cl.
*A45D 26/00* (2006.01)
*G05D 15/01* (2006.01)
*G08B 21/18* (2006.01)

(52) U.S. Cl.
CPC ..... *A45D 26/0023* (2013.01); *A45D 26/0076* (2013.01); *G05D 15/01* (2013.01); *G08B 21/182* (2013.01); *A45D 2026/008* (2013.01)

(58) Field of Classification Search
CPC ............... A45D 25/00; A45D 25/0004; A45D 25/0023; A45D 25/0033; A45D 25/0038; A45D 25/0042; A45D 25/0047; A45D 25/0052; A45D 25/0057; A45D 25/0071; A45D 25/0076; A45D 25/0061; A45D 2026/008; A45D 2026/0095; A45D 26/00; A45D 26/0004; A45D 26/0023; A45D 26/0028; A45D 26/0033; A45D 26/0038; A45D 26/0042; A45D 26/0047; A45D 26/0052; A45D 26/0057; A45D 26/0071; A45D 26/0076; A45D 26/0061; A45D 26/0066; A61B 2017/00752; A61B 2018/00452; A61B 2018/0047;
(Continued)

(56) References Cited

U.S. PATENT DOCUMENTS

2001/0025421 A1* 10/2001 Damstra ................... B25F 5/00
30/43.6
2005/0216035 A1 9/2005 Kraus et al.
(Continued)

OTHER PUBLICATIONS

European search report dated Dec. 5, 2016.

*Primary Examiner* — Katherine H Schwiker
(74) *Attorney, Agent, or Firm* — Kevin C. Johnson

(57) ABSTRACT

There is provided an epilation device for removing body hair with at least one epilation unit. In particular, an epilation barrel, having a plurality of pairs of tweezers for pinching and pulling out hairs from the skin. The epilation device further has a drive unit for driving the at least one epilation barrel and a control unit. The control unit is able to analyze the force with which the user presses the epilation unit to the skin resulting in contact pressure and compares the contact pressure applied to at least one threshold contact pressure. Optionally, the epilation device further has a feedback unit which signals to the user, whether the contact pressure applied is smaller than, equal to, or larger than the at least one threshold contact pressure.

14 Claims, 2 Drawing Sheets

(58) Field of Classification Search
CPC .. A61B 2018/00476; A61B 2090/0065; A61B 2090/0064; G05D 15/01; G08B 21/182
USPC ........................................................ 606/133
See application file for complete search history.

(56) References Cited

U.S. PATENT DOCUMENTS

| | | | |
|---|---|---|---|
| 2007/0129711 A1* | 6/2007 | Altshuler | A45D 26/0061 606/9 |
| 2009/0000126 A1* | 1/2009 | Kraus | B26B 19/046 30/34.1 |
| 2011/0130770 A1 | 6/2011 | Kraus et al. | |
| 2015/0246454 A1* | 9/2015 | Mintz | B26B 19/3873 30/124 |
| 2017/0340085 A1* | 11/2017 | Kindermann | A45D 26/00 |

* cited by examiner

EPILATION DEVICE MEASURING CONTACT FORCE AND COMPRISING A FEEDBACK UNIT

FIELD OF THE INVENTION

The present invention is concerned with an epilation device for removing body hair with at least one epilation unit, in particular an epilation barrel, comprising a plurality of clamping elements, such as pairs of tweezers for pinching and pulling out hairs from the skin. The epilation unit is brought into contact with the skin of a user. Thereby the user applies a force to the housing of the device resulting in a contact pressure between the epilation barrel and the skin. The epilation device disclosed further comprises a drive unit for driving the epilation barrel and a control unit for analyzing and comparing the contact pressure applied with at least one threshold contact pressure. The epilation device may further comprise a feedback unit which indicates to the user, whether the contact pressure is smaller than, equal to or larger than the at least one threshold contact pressure.

BACKGROUND OF THE INVENTION

Standard epilation devices are principally known in the prior art, e.g. from WO 2005/092142 A1. This apparatus comprises an electric motor as a drive unit which is coupled via a gear unit to an epilation unit. In addition, the apparatus further comprises at least a switch for turning the drive unit on and off. Standard epilation devices are used and work as described in the following: Hair removal using mechanical epilators requires bringing the epilation unit, usually an epilation barrel, containing at least one clamping element, e.g. a pair of tweezers, against the skin to be epilated by holding the device at the housing and applying a force on the device. The force applied on the housing is transmitted to the portion of skin to be treated. Upon barrel rotation, the friction between the barrel and the skin is proportional to the normal force that is applied by the user on the device. For an ideal epilation, the barrel has to be pressed against the skin to ensure a good adherence of the tweezers to the skin. However, the pressure on the skin should not be too high to avoid negative effects on both the skin and the device performance. For example, too much pressure on the skin can lead to skin irritation. In addition, due to friction caused by too high pressure on the skin the barrel rotational speed is slowing down, but the performance of hair removal is lower at lower barrel speeds. Further, a higher friction between the epilation barrel and the skin increases the power consumption and the wear of the drive unit. Performance problems will also arise, if the user presses the device against the skin in an excessively cautious manner, i.e. too slight pressure. If the contact pressure is too slight the adherence of the barrel to the skin is not optimal which might cause the performance to decrease especially for short hairs. In particular, new users lack guidance to handle the device in the correct way. They either tend to press too much or too slight, but also experienced users barely use the epilator in the range of optimal contact pressure. Thus, there is a need to detect and analyze the contact pressure during epilation. Current epilator technologies do not feature a way to measure the contact pressure applied against the skin and to give guidance to the user to apply the right amount of pressure onto the skin. Thus, it is an object of the present disclosure to provide an epilation device comprising a control system which analyzes the contact pressure and optionally may give feedback to the users.

SUMMARY OF THE INVENTION

In accordance with one aspect there is provided an epilation device for pinching and pulling out hairs from the skin of a user comprising
- an epilation barrel comprising a plurality of clamping elements, in particular pairs of tweezers;
- a drive unit for driving the epilation barrel into movement;
- a control unit for analyzing a contact pressure between the epilation barrel and the skin of a user and for determining whether the contact pressure is equal to, larger than or smaller than at least one threshold contact pressure, wherein the control unit is adapted to perform a predetermined action when the determined contact pressure is equal to, larger than or smaller than the at least one threshold contact pressure.

In accordance with one aspect there is provided an epilation method comprising indicating a contact pressure between an epilation barrel of an epilation device and the skin of a user, preferably using an epilation device as disclosed herein. The method comprises
- measuring a contact pressure between the epilation barrel and the skin of the user;
- comparing the measured contact pressure to at least one threshold contact pressure;
- determining whether the measured contact pressure is equal to, larger or smaller than the at least one threshold contact pressure;
- indicating by at least one indicator signal to the user whether the measured contact pressure is smaller than, equal to or larger than the at least one threshold contact pressure.

DETAILED DESCRIPTION OF THE INVENTION

Figure 1:
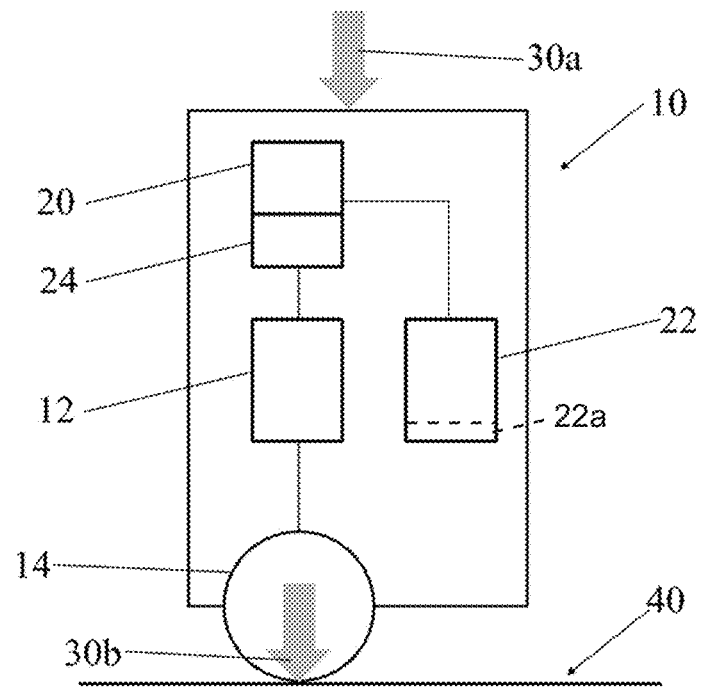
FIG. 1 shows a schematic view of an example embodiment of an epilation device 10 determining a contact pressure 30b between an epilation barrel 14 and a skin 40 of a user by a sensor 22.

The following is a description of numerous embodiments of an epilation device which analyzes the contact pressure and which is adapted to perform a predefined action when the contact pressure exceeds or is below a certain threshold. The description is to be construed as exemplary only and does not describe every possible embodiment since describing every possible embodiment would be impractical, if not impossible, and it will be understood that any feature, characteristic, structure, component, step or methodology described herein can be deleted, combined with or substituted for, in whole or in part, any other feature, characteristic, structure, component, product step or methodology described herein.

As used herein, the word "about" means +/−10 percent.

As used herein, the word "comprise," and its variants, are intended to be non-limiting, such that recitation of items in a list is not to the exclusion of other like items that may also be useful in the materials, devices, and methods of this invention. This term encompasses the terms "consisting of" and "consisting essentially of".

As used herein, the word "include," and its variants, are intended to be non-limiting, such that recitation of items in a list is not to the exclusion of other like items that may also be useful in the materials, devices, and methods of this invention.

As used herein, the words "preferred", "preferably" and variants, such as "in particular" and "particularly" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

By "cm" as used herein is meant centimeter. By "mm" as used herein is meant millimeter. By "μm" or "microns" as used herein is meant micrometer. By "rpm" as used herein is meant rounds per minute. By "N" as used herein in meant Newton.

The present disclosure provides an epilation device for pinching and pulling out hairs from the skin of a user. Said epilation device comprises at least an epilation unit in form of an epilation barrel comprising a plurality of clamping elements, such as pairs of tweezers and a drive unit for driving the epilation barrel into movement. A suitable movement of an epilation barrel according to the present disclosure is a rotation in the range of from about 1200 rpm to about 2500 rpm, preferably in the range of from about 1400 rpm to about 2000 rpm. The epilation performances increase at higher barrel rotation speeds. However, said performance increase is associated with the increase in sound level and power consumption. Barrel rotation within the given ranges represents on optimum between epilation performance, sound level and power consumption.

The present epilation device further comprises a control unit for analyzing a contact pressure with which the epilation barrel is pushed against the skin of a user. Upon barrel rotation, the friction between the barrel and the skin is proportional to the contact pressure resulting from the force applied by the user on the device, the weight of the device, the orientation of the device onto the skin and other device parameters. The present control unit is able to determine said contact pressure and to compare it to at least one threshold contact pressure. Determination of the contact pressure might be indirect by e.g. calculation from the current consumed by the driving unit or may be measured by an additional sensor element. Suitable sensor elements are described below in more detail. The detected contact pressure may be compared to a lower threshold, an upper threshold or more than one upper threshold. Thereby, the control unit is adapted to determine, whether the contact pressure is equal to, larger than or smaller than the at least one threshold contact pressure. In addition, the control unit is adapted to perform a predetermined action when the determined contact pressure is equal to, larger than or smaller than the at least one threshold contact pressure. Said, predetermined action might be initiating an indicator signal, which indicates the violation of the at least one threshold to the consumer, or it might be changing the performance of the drive unit, or it might be changing the performance of the epilation barrel or a combination thereof.

The threshold to be checked by the control unit may be a lower threshold and at least one upper threshold, preferably a first upper threshold and a second upper threshold, wherein the second upper threshold contact pressure is larger than the first upper threshold contact pressure. In particular, the contact unit is adapted to determine whether the detected contact pressure is equal to or larger than a first upper threshold contact pressure. If the user applies too much force to the epilation device so that the first upper threshold contact pressure is exceeded the epilation friction to the skin will cause skin irritation. To avoid that the user uses the epilation device continuously in a mode that may cause skin irritation, the control unit is adapted to indicate to the consumer that the first upper threshold contact pressure is exceeded and that the user has to apply less force to the epilation device. A suitable first upper threshold contact pressure is in the range of from about 1.5 N to about 3.5 N, preferably in the range of from about 2 N to 3 N, more preferred is about 2.5 N or any other numerical range which falls within the given broader numerical range, as if such numerical ranges were all expressly written herein. In addition, to signaling to the consumer that the first upper threshold contact pressure is exceeded the control unit may be adapted for increasing the power provided to the drive unit in dependence on the contact pressure measured so that the movement of the epilation barrel is kept essentially constant and the epilation performance is kept essentially constant, although the higher applied force would slow down the epilation barrel due to friction to the skin. The use of barrel speed control is in particular advantageous in combination with a separate signal to the user that the contact pressure exceeds predetermined threshold contact pressures because the reduction in barrel speed is not needed as indirect feedback by itself.

In addition, the control unit may be optionally adapted to determine whether the detected contact pressure is equal to or larger than a second upper threshold contact pressure, in particular adapted to determine whether the detected contact pressure is equal to or larger than a second upper threshold contact pressure for a preset period of time. If the user applies so much force to the epilation device that the second upper threshold contact pressure is exceeded the epilation unit will nearly stop its motion by the friction to the skin and the drive unit may be damaged. To avoid that the user uses the epilation device continuously in a mode which may damage the epilation device the control unit may be adapted to signal to the consumer that the second upper threshold contact pressure is exceeded and the user has to apply less force to the epilation device. A suitable second upper threshold contact pressure is in the range of from about 4 N to about 5 N, preferably in the range of from about 4.5 N to 5 N or any other numerical range which falls within the given broader numerical range, as if such numerical ranges were all expressly written herein.

In addition, to signaling to the consumer that the second upper threshold contact pressure is exceeded the control unit may be adapted to stop the drive unit, when the detected contact pressure is equal to or larger than the second upper threshold contact pressure, in particular the drive unit may be stopped, if the second threshold contact pressure is exceeded for a preset time period in order to avoid damaging of the drive unit.

In addition or alternatively, the control unit may be adapted to determine whether the detected contact pressure is equal to or smaller than a lower threshold contact pressure. If the user applies insufficient force to the epilation device so that the lower threshold contact pressure is not met the epilation unit will not work properly and the epilation performance is low, in particular regarding shorter hairs. To avoid that the user uses the epilation device continuously with a low epilation performance the control unit may be adapted to signal to the consumer that the lower threshold contact pressure is not met and the user has to apply more force to the epilation device. A suitable lower threshold contact pressure is in the range of from about 0.3 N to about 0.7 N, preferably in the range of from about 0.4 N to 0.6 N, more preferred is about 0.5 N, or any other numerical range which falls within the given broader numerical range, as if such numerical ranges were all expressly written herein.

The control unit used in an epilation device according to the present disclosure is adapted to detect the contact pressure between the epilation barrel and the skin of the user. Said ability to detect may include any possible method of detection, for example using a detection sensor or calculating the contact pressure from an operation parameter of the epilation device. For example, the current consumed is proportional to the contact pressure between the epilation barrel and the skin. Thus, the control unit may calculate the contact pressure from the current consumed by the drive unit in order to drive the epilation barrel. Thereby the contact pressure is calculated with respect to a baseline which represents the idle current consumption of the device without skin contact. The baseline can be adaptive to provide a consistent feedback irrespective of the absolute idle current value which may vary during the lifetime of the epilation device. The adaptive baseline can have different time constants for increasing and decreasing load so that the baseline quickly adjusts to changes in idle mode but only slowly creeps away during load phases. The adaptive baseline can be generated e.g. by low-pass filtering of the current consumed. For example, the contact unit may comprise an amperemeter arranged between a power supply which supplies the electric power for the drive unit, such as a battery and the drive unit.

In addition or alternatively, the control unit may be further connected to a torque sensor for determining the torque required to drive the epilation barrel. Such torque sensor can be inserted at any stage of the drive unit between motor and epilation barrel and can also include indirect torque sensing principles e.g. by measuring retroaction force on a bearing element within the drive unit. Suitable sensors may be for example a capacitive torque sensor, a resistive torque sensor or a piezo electric torque sensor, preferably a resistive sensor measuring the retroaction force on the motor mounting.

In addition or alternatively, the control unit may be further connected to a force sensor adapted to measure the force applied to the epilation barrel via the bearings, which corresponds to the contact pressure between the epilation barrel and the skin. A suitable force sensor may be for example resistive force sensors integrated into both bearing mountings. For example the contact pressure may be detected mechanically. For example, a mechanical detector may include a spring-loaded pin or a lever which is moved upon pressing the epilation barrel against the skin of a user. Said mechanical movement may be transferred into an electrical signal and may be transmitted from the detector to the control unit in order to be compared to the preset threshold contact pressures. Control unit and preset threshold can also be integrated in the mechanical detector, so that when the mechanical movement reaches a pre-defined position, an electrical contact is closed, which directly activates the feedback system.

In addition, the epilation device may further indicate to the user the result of the detection of the contact pressure. In particular, the epilation device may indicate to the user, whether the contact pressure is above the first upper threshold contact pressure. For example, the drive unit may use a tactile signal to give feedback to the user. Preferably, the drive unit may be adapted to reduce the movement of the epilation barrel significantly when the contact pressure is equal to or larger than the first upper threshold contact pressure. In addition or alternatively, the drive unit may be adapted to stop the movement of the epilation barrel for a predefined time period when the contact pressure is equal to or larger than the first upper threshold contact pressure. If the movement of the epilation barrel is reduced the reduction is large enough to be recognized by the user as a signal. A suitable movement reduction of the epilation barrel may be about 250 rpm, preferably about 300 rpm. The reduction of the movement of the epilation barrel may be continuously, for a predefined time period or may be repeated. For example, the reduction may last about 3 secs when the contact pressure is equal to or larger than the first upper threshold contact pressure and the reduction may be repeated for e.g. 3 times. If the epilation barrel is stopped when the contact pressure is equal to or larger than the first upper threshold contact pressure the stop may e.g. last about 3 secs or the epilation barrel may be stopped several times for a shorter period, i.e. the drive unit may stutter. A suitable stutter cycle may be for example stop for 1 sec, move for 1 sec and stop for 1 sec again. Additional cycles may have more repetition or shorter or longer periods. After the change or interruption of the movement of the epilation barrel as a feedback signal to the consumer, the epilation device may continue working within the normal epilation parameters. Alternatively the tactile signal can be provided by a separate vibrating motor mounted in the device which is activated when the pressure contact threshold is exceeded. The vibration of the motor is transmitted to the hand of the user through the housing of the device.

In addition, the epilation device may indicate to the user, whether the contact pressure is above the second upper threshold contact pressure. For example, the epilation device may use a tactile sensation to give feedback about the contact pressure to the user. In particular, the drive unit may be adapted to stop the movement of the epilation barrel when the contact pressure is equal to or larger than the second upper threshold contact pressure for a predefined time period. For example, if the contact pressure is equal to or larger than the second upper threshold contact pressure, for about 3 secs the movement of the epilation barrel may be stopped in order to avoid damages to the drive unit.

In addition, the epilation device may indicate to the user, whether the contact pressure is below the lower threshold contact pressure. For example, the drive unit may be adapted to increase the movement of the epilation barrel significantly when the contact pressure is smaller than the first upper threshold contact pressure. In addition or alternatively, the drive unit may be adapted to stop the movement of the epilation barrel for a predefined time period when the contact pressure is smaller than the lower threshold contact pressure. If the movement of the epilation barrel is increased the change is large enough to be recognized by the user as a signal. A suitable movement change of the epilation barrel may be about 250 rpm, preferably about 300 rpm. The increase of the movement of the epilation barrel may be continuously or for a predefined time period, for example, the increase may last about 3 secs when the contact pressure is smaller than the lower threshold contact pressure. In addition or alternatively, the drive unit may be adapted to stop the movement of the epilation barrel for a predefined time period when the contact pressure is smaller than the lower threshold contact pressure. If the epilation barrel is stopped when the contact pressure is smaller than the lower threshold contact pressure the stop may e.g. last about 3 secs or the epilation barrel may be stopped several times for a shorter period, i.e. the drive unit may stutter. A suitable stutter cycle may be for example stop for 1 sec, move for 1 sec and stop for 1 sec again. Additional cycles may have more repetition or shorter or longer periods. After the change or interruption of the movement of the epilation barrel as a feedback signal to the consumer, the epilation device may continue working within the normal epilation parameters. If changes or interruption of the movement of the epilation barrel are used for indicating exceeding of the upper thresholds and falling below the lower threshold the indication signals have to be different.

In addition or alternatively, the epilation device may further comprise a separate indicator unit for indicating to a user whether the contact pressure is equal to, larger than or smaller than the at least one threshold contact pressure. A suitable indicator unit may be for example a visual indicator unit or an audible indicator unit or a combination thereof. The epilation device may comprise a sound generator which generates an alert sound in order to indicate to the used that at least one of the thresholds is exceeded or fallen below. For example the sound generator will generate the alert signal once, if the contact pressure is equal to or exceeds the first upper threshold contact pressure. In addition or alternatively, the sound generator will generate the alert signal twice, if the contact pressure is equal to or falls below the lower threshold contact pressure and/or the sound generator will generate the alert signal three times, if the contact pressure is equal to or exceeds the second upper threshold contact pressure.

In addition or alternatively, the epilation device may comprise one or two light emitting units, wherein the light emitting units may be arranged to emit the light in the direction of the epilation field. That means the feedback signal is projected against the area of the skin the user is already focusing. In addition, the light emitting unit may be further used to illuminate the area of the skin to be epilated. For example, the epilation field may be illuminated with white light. The control unit may switch the light from white color to red color, if the contact pressure is equal to or exceeds the first upper threshold. That means the indicator unit may be adapted for emitting light in at least two different colors, in particular for emitting white and red light. For example, the indicator unit may comprise two LEDs, one emitting white color and one emitting red color. Alternatively, the indicator unit may comprise one multi-color LED whit is able to emit light in several different colors. In addition, the indicator unit may also indicate when the contact pressure is equal to below the lower threshold contact pressure. For example, the illumination of the epilation field may be reduced or stopped, if the contact pressure is equal to or below the lower threshold.

In addition or alternatively, the epilation device may comprise a display to display visual feedback about the contact pressure to the consumer. The contact pressure may be displayed directly by number or increasing pressure may be displayed by bar plots and/or a red light might be shown on the display of the epilation device, if the contact pressure increases the first upper threshold. In addition or alternatively, a visual feedback signal might be also transferred to any external display, such as to a Smart phone display or a remote display.

In addition or alternatively, the epilation unit may comprise at least a switch for turning the drive unit on and off and at least one regulator for tuning the speed of the drive unit. For example, the apparatus may be turned on by a main switch which causes the drive unit to be actuated with a suitable speed. A suitable speed for rotation of the epilation barrel may be in the range of from about 1200 rpm to about 2500 rpm, preferably in the range of from about 1400 rpm to about 2000 rpm. In addition, the regulator may also be connected to the control unit in order to change the speed of the drive unit in correspondence with the detected contact pressure. For example the drive unit may be adapted to the contact pressure in order to keep a constant epilation performance. Said adaptation to the contact pressure may be preferably activated as long as the contact pressure is between the lower threshold and the first upper threshold contact pressure. For example, the control unit may be adapted such that the speed of the drive unit is increased upon detection of an increased contact pressure and that the speed of the drive unit is decreased upon detection of a decreased contact pressure. In more detail, the control unit may comprise a rotational speed governor and may be provided with a control algorithm regulating the rotational speed of the drive unit to a predefined value, which may preferably be set as required, irrespective of influences on operating voltage or load. For example, the drive unit is tuned to a low speed, which may be too low for proper operation of the apparatus, if the contact pressure is equal to or below the lower threshold in order to indicate to the user that a proper epilation performance is not guaranteed. If the contact pressure is above the lower threshold the algorithm may tunes the drive unit to a higher speed suitable for proper operation. In addition, the speed may be continuously adapted to the contact pressure detected. Finally, as soon as the contact pressure is equal to or above the first upper threshold, the algorithm may tune the drive unit back to the lower speed at least for a predefined period of time in order to indicate to the user that the contact pressure is equal to or exceed the first upper threshold. Finally, the drive unit may be stopped, if the contact pressure is equal to or exceeds the second upper threshold for a predefined period of time. The algorithm may use the values generated by the control unit from the current consumption or the battery voltage or the values based on the sensor feedback.

In addition or alternatively, the present disclosure also provides an epilation method. The method comprises the steps of indicating a contact pressure between an epilation barrel of an epilation device and the skin of a user which is produced by the force applied by the user to the epilation device. For example, said method may be performed by using an epilation device as disclosed herein. The steps of indicating the contact pressure to the user comprises measuring a contact pressure between the epilation barrel and the skin of the user. Then said contact pressure is compared to at least one threshold contact pressure in order to determine whether the contact pressure is equal to, larger than or smaller than at least one threshold contact pressure. Finally, it is indicated to the user by at least one indicator signal whether the measured contact pressure is smaller than, equal to or larger than the at least one threshold contact pressure. In particular, according to the method as disclosed herein the measured contact pressure may be compared to a first upper threshold contact pressure and it may be indicated to the user whether the applied force produces a contact pressure which is equal to or exceeds said first upper threshold contact pressure. Preferably, it may be indicated to the user whether the force applied results to a contact pressure that is equal to or exceeds said first upper threshold contact pressure for a predefined period of time. For example, the indicator signal may change and/or may increase when the contact pressure is larger than a first upper threshold contact pressure. In particular the indicator signal may be a visual signal, such as light and the light may be increased or may change the color from e.g. white light to red light when the contact pressure is equal to or larger than a first upper threshold contact pressure.

In addition or alternatively, the method as disclosed herein may also comprise signaling to the user, when the applied force results in a contact pressure that is equal to or smaller than a lower threshold contact pressure. For example, the indicator signal may changes and/or may decrease when the contact pressure is equal to or smaller than a lower threshold contact pressure. In particular, the indicator signal may be a visual signal, such as light and the light may be decreased, may be turned off or may change the color from white light to yellow when the contact pressure is equal to or smaller than a lower threshold contact pressure.

In addition or alternatively, the method as disclosed herein may also comprise signaling to the user, when the applied force results in a contact pressure that is equal to or larger than a second upper threshold contact pressure. For example, the indicator signal may change and/or may increase when the contact pressure is equal to or larger than a second upper threshold contact pressure. In particular, the indicator signal may be a visual signal, such as light and the light may be increased and/or may change the color from white light to blinking red light and when the contact pressure is equal to or larger than a second upper threshold contact pressure.

Further details and features of the invention may be obtained from the following description of example embodiments in conjunction with the drawings.

FIG. 1 shows a schematic view of an example embodiment of an epilation device 10 with a drive unit 12, e.g. a motor, for driving an epilation barrel 14. A control unit 20 comprises a regulator 24 which is connected to the drive unit 12 and which is adapted to tune the rotational speed of the drive unit 12 which drives the epilation barrel 14. The control unit 20 is further connected to a sensor 22 (detector) which is adapted to measure the contact pressure 30b between the epilation barrel 14 and the skin 40 of the user which results from the applied force 30a and parameters of the epilation device 10 such as the weight or orientation etc. A suitable sensor 22 may be for example a speed governor which measures the rotational speed of the epilation barrel 14 and/or the sensor 22 may measure the torque of and/or the current consumed by the drive unit 12, or the sensor 22 may measure the contact pressure using a pin or a lever 22a, shown schematically in phantom in FIG. 1, which is moved upon pressing the epilation barrel 14 against the skin 40 of a user. The regulator 24 of the control unit 20 is provided with a control algorithm comparing the measured contact pressure 30b with at least one threshold contact pressure. If the measured contact pressure 30b is equal to or larger than a first upper contact pressure, the control unit 20 may initiate that the regulator 24 changes the speed of the drive unit 12 to a predefined value. For example, the drive unit 12 may be stopped or may stutter or the rotational speed may be decreased around 300 rpm. In addition or alternatively, the rotational speed of the drive unit 12 may also be adapted based on the measured contact pressure. For example, the rotational speed of the drive unit 12 may increase proportional to the contact pressure 30b as long as the contact pressure 30b is in the range of a lower threshold and a first upper threshold. A suitable lower threshold may be about 0.5 N and a suitable first upper threshold may be about 2.5 N.

Figure 2:
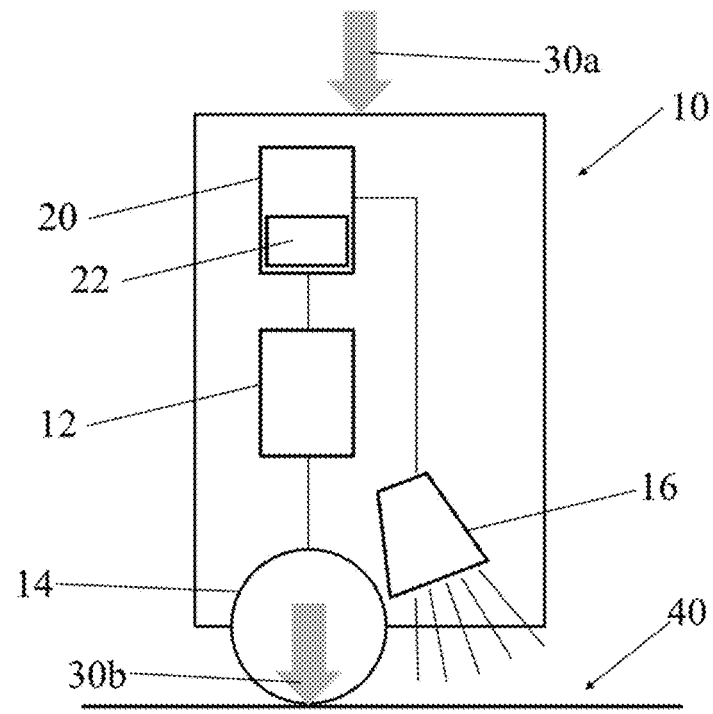
FIG. 2 shows a schematic view of an example embodiment of an epilation device 10 comprising a feedback unit 16 indicating to a user whether a contact pressure 30b between an epilation barrel 14 and a skin 40 exceeds or is below a predefined threshold.

FIG. 2 shows a schematic view of another example embodiment of an epilation device 10 comprising a feedback unit 16. All Features that are in common with FIG. 1 are designated with the same reference numerals. The epilation device 10 comprises a drive unit 12, such as a motor, for driving an epilation barrel 14. A control unit 20 is connected with the drive unit 12 and a feedback unit 16, such as a light signal. If a force 30a is applied to the epilation device 10 externally by a user and the epilation device 10 is brought into contact to the skin 40, the resulting contact pressure 30b between the epilation barrel 14 and the skin 40 is determined by the control unit 20. For example, the control unit may determine the contact pressure 30b from the current consumption needed for driving the epilation barrel 14 by the drive unit 12 with a predefined rotational speed. Therefor the control unit may comprise a sensor 22. If the detected contact pressure 30b is equal to or exceeds a predefined first upper threshold contact pressure the light signal from the feedback unit 16 may change from white light to red light thereby indicating to the user that the first upper threshold was met or exceeded and the user has to reduce the force 30a applied in order to achieve an optimal epilation performance with minimal irritation of the skin 40.

Figure 3:
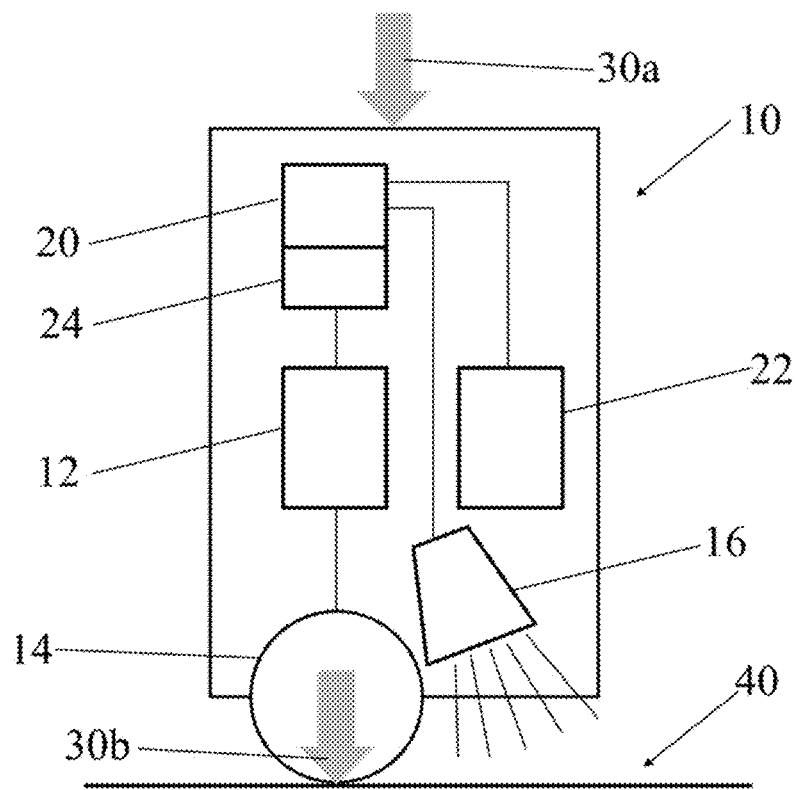
FIG. 3 shows a schematic view of another example embodiment of an epilation device 10 comprising a sensor 22 and a feedback unit 16.

FIG. 3 shows a schematic view of another example embodiment of an epilation device 10 comprising a sensor 22 and a feedback unit 16. All Features that are in common with FIGS. 1 and 2 are designated with the same reference numerals. The epilation device 10 comprises a drive unit 12, such as a motor, for driving an epilation barrel 14. A control unit 20 comprises a regulator 24 which is connected to the drive unit 12 and which is adapted to tune the rotational speed of the drive unit 12 which drives the epilation barrel 14. In addition, the control unit 20 is connected with a feedback unit 16, such as a light signal. Sensor 22 which is adapted to detect the contact pressure 30b between the epilation barrel 14 and the skin 40 is also connected to the control unit 20 in order to determine and set the state of the feedback unit. All examples of measuring and determining the contact pressure described with respect to FIGS. 1 and 2 are also applicable to the epilation device described in FIG. 3. If the detected contact pressure 30b is equal to or exceeds a predefined first upper threshold contact pressure, the light signal from the feedback unit 16 may change from white light to red light, thereby indicating to the user that the first upper threshold was met or exceeded and the user has to reduce the force 30a applied in order to achieve an optimal epilation performance with minimal irritation of the skin 40. In addition, the regulator 24 of the control unit 20 may be provided with an algorithm which adapts the rotational speed of the drive unit 12 to the contact pressure detected. For example, the drive unit 12 may be briefly stopped or may stutter or the rotational speed may be decreased around 300 rpm, if the contact pressure is equal to or larger than a first upper threshold, such as about 2.5 N. In this example embodiment, the user is informed by the change of the light signal and a tactile sensation, namely the change of the rotation of the drive unit that the contact force is equal to or exceeds the first upper threshold. In addition, the rotational speed of the drive unit 12 may be stopped, if the contact pressure is equal to or larger than a second upper threshold in order to avoid damages to the epilation device 10, in particular the drive unit 12. For example, the drive unit 12 may be stopped, if the contact pressure is equal to or exceeds 4 N. In addition, the drive unit 12 may be briefly stopped or may stutter or the rotational speed may be decreased to a lower level, e.g. 900 rpm, if the contact pressure is equal to or smaller than a lower threshold, such as about 0.5 N. In addition or alternatively, the epilation device 10 may also indicate to the user by another visual signal that the contact pressure is equal to or smaller than a lower threshold. For example, the light will change from white light to yellow light, if the contact pressure is equal to or smaller than a lower threshold. That means the example epilation device 10 shown herein indicates to the user whether contact pressure 30b exceeds or is below three different threshold contact pressures using tactile and/or visible indicator signals. In addition, the different feedback signals as described with respect to FIG. 3 may also be combined with the increase in the rotational speed of the drive unit 12 proportional to the contact pressure 30b as long as the contact pressure 30b is in the range of a lower threshold and a first upper threshold. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An epilation device for pinching and pulling out hairs from the skin of a user comprising:
   an epilation barrel comprising a plurality of clamping elements;
   a drive unit for driving the epilation barrel into movement; and
   a control unit for analyzing a contact pressure between the epilation barrel and the skin of a user and for determining whether the contact pressure is equal to or smaller than a lower threshold contact pressure and is equal to or larger than a first upper threshold contact pressure, wherein the drive unit is adapted to reduce the movement of the epilation barrel by a predetermined amount when the contact pressure is equal to or larger than the first upper threshold contact pressure.

2. The epilation device according to claim 1, wherein the control unit is further adapted to determine whether the measured contact pressure is equal to or larger than a second upper threshold contact pressure, wherein the second upper threshold contact pressure is larger than the first upper threshold contact pressure.

3. The epilation device according to claim 2, wherein the predetermined amount is at least about 250 rpm.

4. The epilation device according to claim 2, wherein the drive unit is adapted to stop when the contact pressure is equal to or larger than the second upper threshold contact pressure for a preset time period.

5. The epilation device according to claim 2, wherein the first upper threshold contact pressure is in the range of from about 1.5 N to about 3.5 N.

6. The epilation device according to claim 2, wherein the second upper threshold contact pressure is in the range of from about 4 N to about 5 N.

7. The epilation device according to claim 1, wherein the lower threshold contact pressure is in the range of from about 0.3 N to about 0.7 N.

8. The epilation device according to claim 1, wherein the control unit calculates the contact pressure from a current consumed by the drive unit to drive the epilation barrel.

9. The epilation device according to claim 1, wherein the control unit is connected to a sensor for determining the contact pressure.

10. The epilation device according to claim 1, wherein the control unit is connected to a torque sensor for determining the torque required by the drive unit to drive the epilation barrel.

11. The epilation device according to claim 1, wherein the epilation device further comprises an indicator unit for indicating to a user whether the contact pressure is equal to or smaller than the lower threshold contact pressure and equal to or larger than the first upper threshold contact pressure.

12. The epilation device according to claim 11, wherein the indicator unit is adapted for emitting light in at least two different colors.

13. An epilation method of indicating a contact pressure using the epilation device according to claim 1, the method comprising:
    measuring the contact pressure between the epilation barrel and the skin of the user;
    comparing the contact pressure to the lower threshold contact pressure and the first upper threshold contact pressure;
    determining whether the contact pressure is equal to or smaller than the lower threshold contact pressure and is equal to or larger than the first upper threshold contact pressure; and
    indicating by at least one indicator signal to the user whether the contact pressure is equal to or smaller than the lower threshold contact pressure and is equal to or larger than the first upper threshold contact pressure, wherein the indicator signal changed when the contact pressure is larger than the first upper threshold contact pressure for a preset time period.

14. The epilation method according to claim 13, wherein the indicator signal changes when the contact pressure is smaller than the lower threshold contact pressure.

* * * * *